United States Patent

[11] 3,630,604

| [72] | Inventor | Wendell S. Miller<br>1341 Comstock Ave., Los Angeles, Calif. 90024 |
|---|---|---|
| [21] | Appl. No. | 10,170 |
| [22] | Filed | Feb. 16, 1970 |
| [45] | Patented | Dec. 28, 1971<br>Continuation-in-part of application Ser. No. 645,721, June 13, 1967, now abandoned. This application Feb. 16, 1970, Ser. No. 10,170 |

[54] OPTICAL PROJECTION APPARATUS
30 Claims, 10 Drawing Figs.

[52] U.S. Cl. .................................................. 353/99
[51] Int. Cl. .................................................. G03b 21/28
[50] Field of Search ................................ 353/69, 70, 98, 99; 352/69, 86; 350/125, 123, 293, 144

[56] References Cited
UNITED STATES PATENTS

| 1,053,650 | 2/1913 | Saalburg | 353/99 |
| 2,510,080 | 6/1950 | Cuneo | 353/99 |
| 3,340,765 | 9/1967 | Herrioty | 353/38 |

*Primary Examiner*—Harry N. Haroian
*Attorney*—William P. Green

ABSTRACT: Projection apparatus including a first lens system operable by orthoscopic projection to produce an image of an optical object on a light director structure shaped essentially as a conicoid of revolution and a second lens system of prescribed distortion characteristics operable to view the image and reproject it onto a screen which is also shaped essentially as a conicoid of revolution, but on which the image appears from a predetermined audience area to be an orthoscopic projection of the optical object. Preferably, the two conicoids have a common axis of revolution, with the two projection lenses and the optimum viewing location being positioned on that axis. In general, the director structure has a large number of reflective facets which are so oriented as to direct the light of the image thereon primarily along converging paths and in concentrated form toward the second lens system. In one particular case these facets may fuse into a smooth condensing reflector.

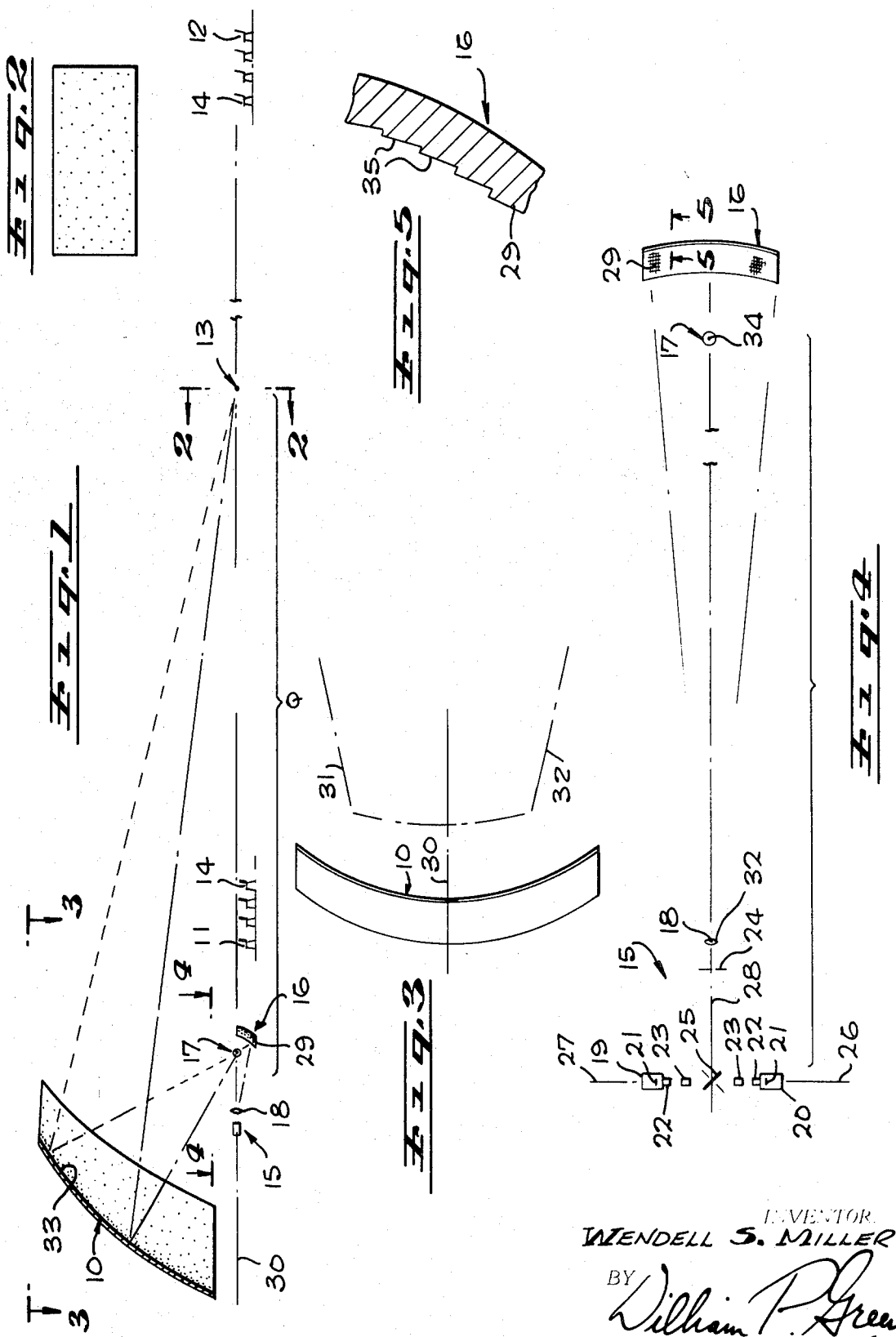

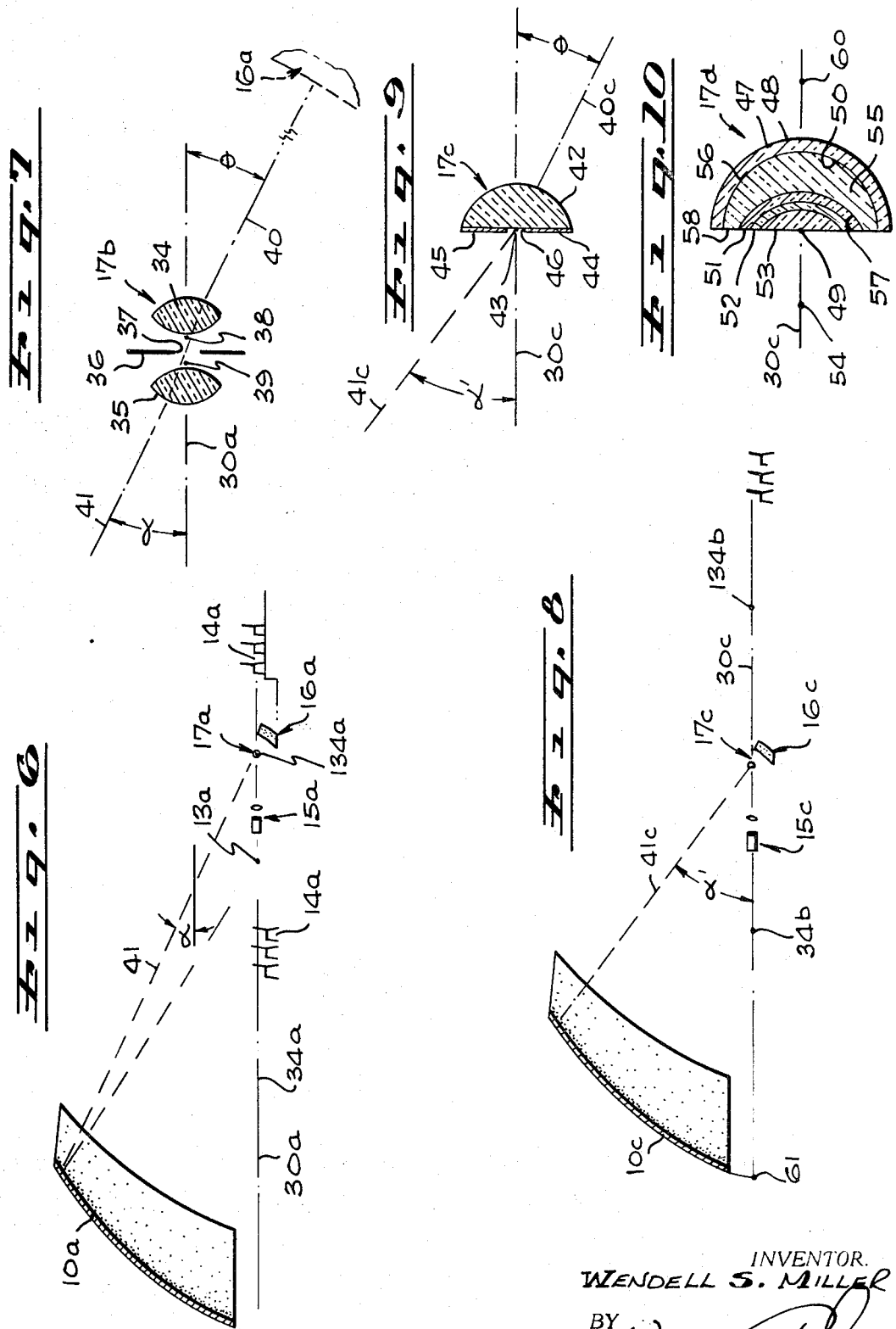

OPTICAL PROJECTION APPARATUS

CROSS-REFERENCE TO RELATED APPLICATION AND PATENT

This application is a continuation-in-part of my copending application Ser. No. 645,721, filed June 13, 1967 on "Optical Projection Apparatus," now abandoned. Certain features of the present apparatus have also been disclosed and claimed in my copending application Ser. No. 620,864, filed Mar. 6, 1967, on "Optical Projection System," and in my U.S. Pat. No. 3,253,505, issued May 31, 1966, on "Projection of Images Onto Inclined Screens."

Projection optics of the type taught here find especial use in projection systems of the type disclosed in my prior U.S. Pat. Nos. 2,974,564 and 2,974,565.

BACKGROUND OF THE INVENTION

This invention relates to optical projection apparatus, for projecting an image onto a doubly curved screen so as to be seen as undistorted.

In recent years, many attempts have been made to attain novel projection effects, as by widening the screen onto which a motion picture or other image is projected, curving the screen or otherwise shaping it to improve the audience coverage or "audience presence," projecting onto the screen from an "off-axis" location (a location not aligned with a primary viewing axis of the audience), or otherwise altering the projection arrangement from the conventional substantially on-axis projection onto a flat screen. These various special effects which have been sought are in most instances of a character such that, though they may in one respect produce an improved visual result, they also have the undesirable effect of introducing into the projected picture an unwanted distortion, so that an image which on the film is rectangular may on the screen appear to viewers to be of a nonrectangular, distorted shape. Further, such distortion of the peripheral configuration of the viewed image of course is accompanied by corresponding distortion of the scene being depicted, and all of its components.

It is noted that an image free from distortion conventionally may, and usually does, exhibit a change in scale or magnification of the type produced by orthoscopic projection. That is to say, it is a central projection with respect to a point on an axis in which there is a constant ratio of the tangents of the angles of inclination of chief rays to that axis before and after projection. See Southall, Mirrors, Prisms & Lenses, 3rd Ed., Sect. 192.

SUMMARY OF THE INVENTION

The present invention relates to an improved projection system which is capable of attaining many of the special effects which have been found desirable for various reasons, and yet which can achieve these results without introducing any perceivable distortion into the projected picture. For one thing, a system embodying the invention can project onto a screen which has a high degree of curvature, and yet presents an appearance to the audience of a true undistorted rectangular picture. Further, the screen may be curved in two different directions, that is both horizontally and vertically, and may therefore curve inwardly toward and about the audience at opposite sides of the audience area, and at the top of the screen, in a manner attaining the optimum in both audience coverage capacity, and audience presence, the latter resulting from the peripheral vision effects attained by the wide curved screen. In addition to these results, the system of the invention enables projection onto the screen in an off-axis direction, to thereby attain the well-known advantages resulting from such off-axis positioning of the projector as taught by applicant's prior patents cited above.

To accomplish this, an installation using the invention includes two optical projection systems, the first of which projects an image in focus on a curved light-reflecting structure, while the second optical projection system views the image on that structure and reprojects it as a second image onto a screen of the desired curved shape. The light-reflecting structure is shaped as essentially a curved conicoid of revolution, with the second optical projection system preferably being located essentially at a focus of that conicoid. The screen itself is also shaped essentially as a curved conicoid of revolution, which is the optical conjugate of the first conicoid with respect to projection through the mentioned second system. The two conicoids of revolution optically have essentially a common axis of revolution, and the second projection system is located essentially on the common axis. The second projection system directs the chief ray from the reflector structure to the screen with a change in the angle $\theta$ of the incoming ray, with respect to the axis, to the angle $\theta'$ where $\sin \theta' = n \sin \theta$. In the special case where $n = 1$, this gives orthoscopic projection with unit angular magnification.

The first conicoidally shaped structure onto which the image is projected may be an optical light-directing unit which is specially shaped to direct the light from the image thereon along generally converging paths, and toward the second projection system in concentrated form. For this purpose, this optical director should have an irregular surface forming a large number of reflective facets formed to direct the light along the desired converging paths. In one distinguished form of this invention the directing unit may be a conventional mirror (preferably first surface) in the shape of an ellipsoid of revolution. In this case there is a small degree of freedom from the requirement that the intermediate image be in focus on the surface of the director unit.

BRIEF DESCRIPTION OF THE DRAWINGS

The above and other features and objects of the invention will be better understood from the following detailed description of the typical embodiments illustrated in the accompanying drawings, in which:

FIG. 1 is a somewhat diagrammatic vertical central section through a projection installation constructed in accordance with the invention;

FIG. 2 is a view representing the appearance of the screen and image thereon as viewed from an optimum viewing location, and specifically from the plane 2—2 of FIG. 1;

FIG. 3 is a diagrammatic plan view representation of the screen taken on line 3—3 of FIG. 1;

FIG. 4 is an enlarged plan view of a portion of the apparatus taken on line 4—4 of FIG. 1;

FIG. 5 is an enlarged fragmentary vertical section through a portion of the director, and taken on line 5—5 of FIG. 4;

FIG. 6 is a view similar to FIG. 1 but showing a variational form of the invention;

FIG. 7 is an enlarged detail view of a variational type of lens assembly which may be employed as the second projection system in FIG. 6 or FIG. 1;

FIG. 8 shows another variational overall arrangement; and

FIGS. 9 and 10 show two types of lenses which may be employed in FIG. 8.

DESCRIPTION OF THE PREFERRED EMBODIMENT

Referring first to FIG. 1, I have represented in that figure a projector installation for use in a motion picture theater, indoor or outdoor, or any other situation in which a projected picture is to be viewed by an audience. In FIG. 1, it may typically be assumed that the projection screen 10 is located at the left end of the theater within which an audience fills a predetermined audience area from the front seat location 11 to a rear seat location 12 near the back of the theater. The audience area also of course extends laterally a substantial distance between two opposite sides of that area, with a theoretically optimum viewing location being designated 13 in FIG. 1, and being positioned generally near the center of the audience area. For best results the optimum viewing location 13 at which maximum freedom from distortion is attained should be considered to be midway between the opposite sides of the audience area, and, referred to the screen, at essentially the geometrical mean between the portions of the audience area which are closest to and farthest from the screen (locations 11 and 12 of FIG. 1). Seats such as those represented at 14 are of course distributed across the entire audience area.

The picture to be projected onto screen 10 originates with a first projection system 15, which projects a first image of an optical object onto the surface of a light director structure or unit 16, from which the light is projected by a second projection system 17 as a second image on the surface of screen 10. The first projection system 15 is of a character adapted to produce a focused orthoscopic projection of the optical object onto the surface of optical director unit 16. To achieve this result, system 15 may include a relay projection lens 18 (FIG. 4), functioning as the primary lens unit for projecting the image onto director 16. This lens 18 may receive the light to be projected from either one of a pair of selectively usable conventional motion picture projectors 19 and 20. As will be understood, each of these projectors 19 and 20 contains a motion picture film 21 which carries a picture constituting the optical object to be projected onto screen 10. Each projector 19 also may have a conventional projection lens 22, designed to produce rectilinear projection of the film focused at infinity, but which in this case is utilized in conjunction with a supplemental lens 23 for producing a focused aerial image of the subject matter on the film at the location designated 24 in FIG. 4, with this aerial image being undistorted with respect to the original object. This focused aerial image is viewed by relay lens 18, which acts to project a corresponding focused image by previously discussed orthoscopic projection onto director 16.

For selecting between the two alternatively usable projectors 19, there may be provided a planar mirror 25 located between the two projectors 19 and 20, and mounted to swing about a vertical axis between the full-line position of FIG. 4, and the broken-line position of that figure. The two projectors 19 and 20 may face directly toward one another, so that their axes of projection 26 and 27 coincide, to aim light in opposite directions toward the mirror. When the mirror is in its full-line position of FIG. 4, it reflects the light from projector 20 along a central axis represented at 28 which is perpendicular to axis 26, and which is perpendicular to image 24 and to the transverse plane of lens 18. When the mirror is turned through 90° to the broken-line position of that figure, the light from projector 19 is reflected along the same axis 28, toward lens 18. Thus, the two projectors may be utilized alternately to show successive reels of a motion picture, with mirror 25 acting to select between the projectors, and with the rest of the apparatus beyond the mirror being in continuous use, with both of the projectors 19 and 20, so that the major portion of the present apparatus does not a have to be duplicated.

The light reflecting surface of director unit 16 onto which the "first projection system" 15 projects its image is the surface 29 of unit 16 which faces upwardly and leftwardly in FIG. 1. This surface is irregularized in a manner to be brought out below, but except for that irregularization, follows essentially the curvature of a conicoid of revolution. For example, this reflective surface maybe shaped essentially as a paraboloid of revolution, ellipsoid of revolution, or hyperboloid of revolution, with it being preferred in many cases that the curvature be ellipsoidal. The axis of revolution of the ellipsoid which defines upper surface 29 of director unit 16 is represented at 30 in FIG. 1, and desirably extends through the audience area, midway between the opposite sides 31 and 32 of that audience area, and passes through the optimum viewing location 13 near the center of the audience area. The first projection system 15 is also preferably located on the axis 30 of revolution of the conicoid defining upper surface 29 of director unit 16, and more specifically, the relay lens 18 from which the orthoscopic projection into the surface of director unit 16 is projected should for best results have its center of projection 32 located on axis 30.

The second projection system 17 acts to reproject the image from director unit 16 upwardly and leftwardly in FIG. 1 onto the surface 33 of screen 10, again in focused form. This surface 33 of screen 10 is also curved as a conicoid of revolution, having its axis of revolution coincident with axis 30 of the conicoid defining director unit 16. Thus, as seen clearly in FIGS. 1 and 3, the viewed surface 33 of the screen has double concave curvature, curving concavely in vertical section as seen in FIG. 1, and in horizontal section as seen in FIG. 3. Both of these types of curvature continue across the entire visible area of the screen, that is through the entire height of the screen and across its entire horizontal width. Surface 33 may be of any known character used on projection screens, and may typically as an example be formed of a large number of reflective generally spherical glass beads, or the like, a specular lenticulated surface being quite desirable.

The "second projection system" 17 is desirably an orthoscopic lens of unit angular magnification which projects the second image on surface 33 of screen 10 as a "central" projection. In this connection, it is noted that the term "orthoscopic" as used in this applications refers to a lens which produces an approximately pure central projection essentially free of higher order distortion. See Southall, loc. cit. A particular case of such orthoscopic projection characterized by unit angular magnification is produced by the concentric spherically symmetric lens and the symmetric doublet disclosed.

An additional requirement upon the second projection lens is that it shall have a Petzval surface in the form of a conicoid of revolution whose semi latus rectum (which is equal to the axial Petzval radius of curvature) shall be less than the semi latus rectum of the conicoidal directing element. This criterion is of course satisfied inherently by the concentric spherical lens described since the Petzval surface of such a lens is a sphere, concentric to the lens, and the semi latus rectum of this sphere (equal to its radius) must be less than the semi latus rectum of the directing element in order to obtain focus of any image on that element at the finitely distant position of the screen.

Thus, lens 17 is desirably a concentric spherically curved lens, consisting of a precisely round sphere of transparent reflective material, preferably having one or more concentric spherical shells of transparent refractive material thereabout (as shown for example in my copending application Ser. No. 620,864). The center 34 of this lens should be located on the common axis of revolution 30 of the two conicoids defining director 16 and screen 10, and should be coincident with a focus of the conicoid defining surface 29 of director 16, and also with a focus of the conicoid defining surface 33 of the screen. Thus, the two conicoids have coincident focii on axis 30 and at which lens 17 is positioned.

As indicated above, the surface 29 of optical director 16 is generally not a smooth light-reflective surface, but rather is irregularized, and specifically is so shaped as to form a large number of minute facets distributed across the entire area of surface 29, and so formed and positioned as to direct the light from the image on surface 29 primarily along converging paths into lens 17, and specifically toward the center of the lens. In FIGS. 4 and 5, these small reflective facets are represented at 35, with each facet preferably being planar and being specularly reflective, and so positioned as to reflect light rays received from the center 32 of lens 18 directly toward the center of projection of lens 17. In this way, the major portion (and preferably substantially all) of the light focused on director 17 by lens 18 as the "first image" is aimed in concentrated form through the center of lens 17 for rectilinear projection on the screen at maximum possible brightness. In all save the one special case described below, the amount of light which is directed through or reaches lens 17 is thus much greater than would be the case if surface 29 were a smooth surface following precisely the curvature of the same conicoid which it does follow essentially. This is true regardless of whether the smooth surface being considered might be specularly reflective or diffusively reflective. The director 16 may be given its multifaceted shape by molding it of an appropriate resinous plastic material, with the facets 35 dimensioned and oriented as desired, and with appropriate specularly reflective material being coated on the facet surfaces after formation of the part.

The conicoid defined by surface 33 of the screen 10 is preferably an optical conjugate of the conicoid defining upper surface 29 of director 16, with respect to projection of light through their common focus 34. To define this conjugate relationship mathematically, assume that the equation for the conicoid defined by surface 29 of director 16 (disregarding the irregularization of that surface by facets 35) is:

$$\frac{y_1^2+z_1^2}{b^2}+\frac{(x_1-\sqrt{a^2-b^2})^2}{a^2}=1$$

where:

$x_1$, $y_1$, and $z_1$ are the Cartesian coordinates of any point on the surface 29 of the director 16, assuming that the X-axis coincides with axis 30 of FIG. 1, and that the origin of coordinates is at point 34 of FIG. 1, $a$ is the semimajor axis of the conicoid of surface 29, and $b$ is the semiminor axis of the conicoid of surface 29, and is less in magnitude than $a$.

If the above equation is the conicoid of the surface 29, then the conjugate conicoid which defines surface 33 of the screen is represented by the following equation:

$$r=\frac{Lp/(L-p)}{1+\frac{(pL-fL-pef)\cos\theta}{f(L-p)}}$$

where:

$r$ is the length of the radius vector to the screen 10 from the second projection lens at an angle $\theta$ to the axis;

$f$ is the axial focal length of that lens 17;

$p$ is the Petzval radius of that lens 17;

$L$ is the semi latus rectum of the director element; and $e$ is the eccentricity of the director element.

In the special case of a concentric spherically symmetric lens 17, the Petzval radius $p$ equals the axial focal length $f$ and then in Cartesian coordinates the conjugate conicoid which defines the surface 33 of the screen is given by equation:

$$\frac{(y_2^2+z_2^2)}{\left(\frac{b^2f^2}{b^2+f^2-2fa}\right)}+\frac{\left(x_2-\frac{f^2\sqrt{a^2-b^2}}{f^2+b^2-2fa}\right)^2}{\left(\frac{f(b^2-fa)}{f^2+b^2-2fa}\right)^2}=1$$

where:

$x_2$, $y_2$, and $z_2$ are the Cartesian coordinates of the second conicoid (screen 10), with the origin at 34 and the X-axis coinciding with axis 30 of FIG. 1, $a$ and $b$ are the semimajor and semiminor axes respectively of the conicoid of surfaces 29 of the director, and $f$ is the focal length of lens 17.

In the equation given above for the conicoid of surface 29, it may be noted that, if $b$ is a real number, the conicoid defined is an ellipsoid; if $b$ is an imaginary number, the conicoid is a hyperboloid; and as the ratio of $b$ to $a$ approaches zero, the conicoid defined becomes a paraboloid.

It can be demonstrated mathematically that, if the centers of projection of lenses 17 and 18 are both located on the common axis of revolution 30 of the conicoids, there will be an optimum viewing location 13 from which the sharply curved image projected on screen 10 will appear to be precisely rectangular (in a plane perpendicular to the axis), and an orthoscopic projection of the object so long as the object viewed by lens 18 (aerial image 24) is rectangular and disposed perpendicular to axis 30. Also, from other locations in the viewing area, the image on the screen will still have an appearance which is undistorted to the extent that it will appear substantially to be a rectangle viewed from an offset location. Thus, optimum distortion free characteristics are made possible by the disclosed arrangement.

To adapt the present apparatus for use in a particular size theater or viewing area, the distance $Q$ between the common focus 34 of the two conicoids and the optimum viewing location 13 can be accurately predetermined by proper adjustment or selection of the distance $q$ between the common focus 34 and the center of projection 32 of lens 18 of the first projection system 15. More specifically, it may be stated that:

$$Q=\frac{paq}{q\sqrt{a^2-b^2}+b^2-ap}$$

and $$q=\frac{Q(b^2-pa)}{pa-Q\sqrt{a^2-b^2}}$$

where:

$a$ and $b$ have the same meanings set forth above in defining the two optically conjugate conicoids; and $p$ is the Petzval radius of the second projection lens.

In the special case of the concentric spherically symmetric lens 17 of FIG. 1, the Petzval radius is equal to the focal length and these formulas hold with $p$ replaced by $f$, the focal length of the second projection lens. In a particular installation such as that shown in FIG. 1, I merely predetermine or adjust the distance $q$ so as to locate the optimum viewing position 13 at a point generally near the center of the predetermined viewing or audience area, and preferably at the particular optimum location set forth hereinabove (i.e., at the geometric means between the closest and farthest viewing points).

In using the apparatus of the FIGS. 1 to 5, a projectionist may first turn mirror 25 to the full-line position of FIG. 4, and then energize projector 20 to produce aerial image 24, which is projected in focused form, as a central projection, on the multifaceted surface 29 of director 16. The image thus focused on surface 29 is projected by lens 17 in focused form as a second image on screen 10, which is then viewed by persons within the above-discussed viewing area, with maximum freedom from distortion throughout that area. The facets 35 of director 16 concentrate the light of the first image on lens 17, directing substantially all of that light through the center of the lens for projection onto the screen, and for viewing from the audience area. It will be obvious that the primary axis of projection of light from lens 17 onto the screen does not coincide with the primary viewing axis, since the light from lens 17 is directed generally upwardly, while the viewing axis is generally horizontal, so that off-axis projection has been attained in addition to the freedom from distortion. Also, the extension of the screen in curved fashion at the sides of the audience area, as well as toward the audience as the screen advances upwardly, gives the audience the much desired feeling of audience presence.

In many instances, optimum results are attained when the conicoid of surface 29 is an ellipsoid, and the conicoid of surface 33 of the screen is a paraboloid. In other situations, however, screen 10 may be shaped as an ellipsoid, to have greater curvature for increased audience "presence" effect, or the director surface 29 may be a paraboloid, or either of the two conicoids may be a hyperboloid. It may also be noted that the term "conicoid" is used in this application as including a sphere, which is a degenerate form of ellipsoid.

FIG. 6 represents diagrammatically a variational form of the invention which is fundamentally essentially the same as the FIG. 1 arrangement except as to the relative positioning of the various components of the system, and changes in curvatures and characteristics consistent with the positional changes. As in the first form of the invention, a first projection system 15a projects a first image in focus on a director or reflecting structure 16a, with a second projection system 17a acting to view the first image on director 16a and reproject it in focus on a screen 10a, for viewing by persons positioned on seats 14a. The optimum viewing location in FIG. 6, corresponding to location 13 in FIG. 1, may typically be at the location designated 13a.

As in the FIG. 1, arrangement, the screen 10a is a conicoid of revolution, whose axis of revolution may extend horizontally and is represented at 30a in FIG. 6. The conicoid of revolution defined by screen 10a may be of a type having two usable focii 34a and 134a (for example, it may be an ellipsoid of revolution). The second projection system 17a may be a concentric spherical lens of the same type as lens 17 in FIG. 1, and may have its center located at either of the two focii 34a or 134a, but is typically illustrated as positioned at the outermost one of these focii, that is, at the focus which is farther from screen 10a. Such positioning of the lens 17a may be desirable for drive-in theater installations in which projection from a distant location is conventionally felt desirable, while positioning of the lens at the nearer focus 34a would be preferred for some other types of installations.

Director structure 16a is of the same type of multifaceted reflective construction described in connection with director 16 of FIG. 1, and like director 16 takes the form essentially of a conicoid of revolution which has the same axis of revolution 30a as screen 10a. However, the conicoid defined by director 16a may of course be a different conicoid than the particular conicoid defined by director 16 of FIG. 1 or at least the same shape conicoid positioned about the other focus. The conicoid of director 16a has a focus coincident with focus 134a of the screen, and therefore coincident with the center of lens 17a, and of course also lying on the common axis of revolution 30a, as do both of the focii 34a and 134a. The conicoid of screen 10a is the optical conjugate of the conicoid of director 16a, with respect to focus 134a and lens 17a, and as a result the "first image" which is focused on the director is projected in focus on the conicoid-shaped screen 10a. Additionally, the various formulas and equations set forth hereinabove in discussing the FIGS. 1 to 5 arrangement are applicable also to the arrangement of FIG. 6, as will be apparent without further lengthening of this disclosure by repetition of the formula and equation relationships. Because of the effect attained by use of the conicoidal structures and related apparatus, the conicoidally shaped image on screen 10a appears from an optimum location 13a to be precisely rectangular in outline, and from other locations in the viewing area appears the same as a rectangle would from a correspondingly offset location.

The first projection system 15a of FIG. 6 may be the same as system 15 of FIGS. 1 and 4, and acts to project the first image in focus on the conicoidally shaped multifaceted surface of director 16a, for reprojection onto the screen in the manner discussed above.

When this configuration is utilized the special case wherein director structure 16a may be an ellipsoidal mirror occurs. In both the FIG. 1 and FIG. 6 cases, the common focus of the two conicoids where the second projection lens is situated may be designated the "used" focus of the respective conicoids. For each of these conicoids there is then also an "unused" focus which does not enter into the relevant optical considerations. In each case the unused focii lie in the same direction from the used focii with respect to the lens. In the FIG. 1 form this means that the unused focus of the conicoid 16 is on the opposite side of the lens 17 from the desired position of projector 15 and thus is optically inconsequential. However, in the FIG. 6 form this focus is on the same side as the projector 15a and can be used as a distinguished position for the projector. As mentioned the director structure 16a may then be an ellipsoidal mirror and may then synergicly function as a conventional condenser mirror in addition to providing an intermediate optical object. Further, in this case, since the image-dissecting effects of the faceted directors when used in an out-of-focus position are not present, the intermediate image may be slightly displaced from the surface to defocus surface blemishes by bringing into play the well-known imagery capabilities of the ellipsoidal mirror. Obviously, only a slight displacement can be tolerated before the optical aberrations other than defocusing become objectionable. If this option is employed, a smaller effective aperture size must be used and greater perfection in the shaping of the ellipsoid must be had since the mirror now serves as an effective optical element in the image-forming domain as well as a condenser in the illumination domain. The effective focal length $F$ of such a mirror of semi latus rectum $L$ and eccentricity $E$ for narrow bundles of light varies with the angular displacement $\psi$ of the reflecting point as:

$$F = \frac{L}{2} \frac{(1 + 2E \cos \psi + E^2)}{(1 + E \cos \psi)^2}$$

FIG. 7 illustrates at 17b another type of orthoscopic lens system which may be substituted for the spherical lens 17a of FIG. 6. Specifically, the lens assembly 17b includes two convex lenses 34 and 35, which may be identical and spaced axially apart and have a common axis coincident with the axis 30a of FIG. 6. Between the two lenses 34 and 35, there may be provided an opaque element 36 having an aperture stop opening 37 centered about axis 30a. The two nodal points of the lens assembly 17b of FIG. 7 are represented schematically at 38 and 29. An incoming chief ray aimed from director 16a toward the first nodal point 38 of the lens assembly is refracted by the lens assembly 17b in a manner such that it emanates from the opposite side of the lens towards screen 10a along a line 41, which has its apparent origin at the second nodal point 39, and which line 41 is parallel to the incoming line 40. For optimum functioning, the lens assembly of FIG. 7 is so located relative to the other components of the system that the first nodal point 38 of the lens assembly is coincident with a focus of the conicoid of revolution defined by director structure 16a, while the second nodal point 39 is coincident with a focus of the conicoid of revolution defined by screen 10a. Thus, the two conicoids do not have focii which are precisely coincident, though their focii are at essentially the same location, and lens assembly 17b is positioned at essentially that same location, in general correspondence with the spherical lens arrangements of FIGS. 1 and 6. When the concentric spherical lens of FIgS. 1 and 6 is employed, its two nodal points are coincident with one another, and positioned at the center of the spherical lens, which is then desirably made coincident also with the focii of the two conicoids defined by the screen and director.

The lens of FIG. 7 does not in general have the same spherical Petzval surface with radius $p$ equal to the axial focal length $f$ of the concentric spherical lens of FIG. 1. Its Petzval surface will at least for moderate angles of departure from the axis be parabolic or ellipsoidal in nature with eccentricity = $(p-f)/f$ and semi latus rectum equal to the axial Petzval radius $p$ which is in turn determined by the conventional Petzval sum. Such sum is necessarily positive for the lens shown in FIG. 7 and will become increasingly so if the two components of the doublet are individually achromatized with ordinary optical glass. Such a lens is generally more suited to use in the FIG. 6 configuration where smaller departures from the axis of projection are encountered. Other forms of orthoscopic lenses of unit angular magnification and appropriately positive Petzval sum may of course be used.

While the foregoing preferred form has treated the second projection lens system as anastigmatic, it is true that lenses other than the concentric spherically symmetric form may show appreciable astigmatism. It is known that in the case of astigmatic lenses any position of image between the sagital and tangential focii will give about the same degree of image quality degradation. Thus a screen surface may be used which falls within this range. With astigmatism this image surface will not lie on the Petzval curve and thus when employing the formulas exhibited above in this case the image surface should be used rather than the Petzval curve and the radius of curvature of the image surface on the axis should be used for the Petzval radius.

FIG. 8 shows another variation in which screen 10c, the first projection system 15c, and director 16c may all be considered as identical with the corresponding parts 10a, 15a, and 16a of FIG. 6, with the second projection system 17c being redesigned to avoid the necessity of positioning of that projection system 17c at essentially the location of one of the focii 34b or 134b of the conicoid of revolution defined by screen 10c. More particularly, lens 17c may have the partial spherical configuration illustrated in FIG. 9, to present at its light-entrance side a spherically curved surface 42 disposed about a center 43 located on the common axis of revolution 30c of the two conicoids. At its light-exit side, a lens 17c may have a planar surface 44 disposed perpendicularly to axis 30c, and typically extending through center 43, though it is to be understood that arrangements may be devised in which surface 44 does not necessarily pass through center 43 and the entire lens is not therefore an exact hemisphere. The planar surface 44 may be blocked off by an opaque angular stop element 45 except at the location of a central circular aperture stop opening 46 through which light from the lens is permitted to exit toward screen 10c. This stop is preferably located athwart the center 43 of spherical surface 42. The incoming light ray designated 40c in FIG. 9 represents the same image element as does ray 40 in FIG. 7, and is disposed at the same angle $\theta$ with respect to axis 30c. This ray upon exit from lens 17c in FIG. 9 is flared radially outwardly as indicated at 41c to an increased angle $\alpha'$ with respect to axis 30c, which angle is greater than the angle $\alpha$ of ray 41 in FIG. 7, and is no longer parallel to the corresponding input ray 40c. This flaring action results from the discussed partial spherical configuration of lens 17c and enables the lens to be positioned at a location along axis 30c other than the locations of the two focii 34b and 134b. In fact the position 17c for the second projection lens in this form is closer by a factor $n$ to the intercept 61 of the conicoid 10c conicoid with axis 30c than is the farther focus 134b. Both of the nodal points of lens 17c are located at the center of curvature 43 of spherical surface 42, which center is in the FIGS. 8 and 9 arrangement positioned at a focus of the conicoid of revolution defined by director 16c.

The single element lens 17c of FIG. 9 would be satisfactory for the discussed purpose in handling monochromatic light with a small aperture stop. In that case, due to astigmatism of incidence on the plane face the sagital focal surface would be at the screen. FIG. 10 shows an improved form of the FIG. 9 lens which has been corrected to eliminate chromatic aberration and spherical aberration, to allow use of the system with multicolored light and a larger $f$-stop. Lens 17d of FIG. 10 has an outer spherical first element 47 with an outer spherically curved surface 48 disposed about a center 49 located on axis 30c of FIG. 8. Element 47 also has an internal spherical surface 50 disposed about the same center 49. Three inner partial spherical elements 51, 52, and 53 may be disposed about another center 54, with an intermediate element 55 having nonconcentric spherical surfaces 56 and 57 disposed about the two centers 49 and 54 respectively, to occupy the space between element 47 and element 51. All of the elements 47, 51, 52, 53 and 55 define together a common planar surface 58 at their left side, disposed tranversely of axis 30c and typically though not necessarily passing through center 49, so that surface 58 corresponds to the light-exit surface 44 of FIG. 9. Elements 51, 52 and 53 are designed to introduce a longitudinal chromatic aberration which is off-axis and of a value to exactly correct for lateral chromatic aberration in the lens. Outer element 47 compensates for spherical aberration in the overall assembly. As a result, the same type of operation discussed in connection with FIG. 9 is obtained by the FIG. 10 lens, but with corrections enabling the assembly of FIG. 10 to be utilized without the small $f$-stop provided by element 45 of Fig. 9, and with multicolor light, while still providing an ultimate image which is sharply focused and not distorted on screen 10c. As in FIG. 9, the nodal point 49 desirably coincides with a focus of director structure 16c, but of course does not coincide with either of the focii 34b or 134b of screen 10c.

In referring generically to the various types of projection systems or lenses which may be utilized as the second projection system of the different arrangements illustrated in the drawings, including lenses 17, 17a, 17b, 17c, 17d, and the different possible equivalents and variations of these lenses, I find it convenient to designate the usable types of projection elements or lenses by the generic term "coscopic lenses" or "coscopic projection systems." In designating a projection element or lens as coscopic I define that element as being constructed to divert a general incoming chief ray which is directed at an angle $\theta$ to the axis of the lens system at an exit direction $\alpha$ whose angle with respect to the axis of the lens assembly is defined by the formula: $\alpha = \sin^{-1}(n \sin\theta)$ In FIG. 7, exit direction 41 is parallel to input direction 40, and therefore the exit angle $\alpha$ defined by the above formula is equal to the entrance angle $\theta$ indicating that the lens is orthoscopic with an angular magnification of one. For this and other orthoscopic lenses with angular magnification of one, such as the concentric spherical lenses 17 and 17a of FIGS. 1 and 6, the value of $n$ in the above formula is 1, so that these lenses are species of coscopic lenses as defined. In the arrangements of FIGS. 9 and 10, the exit angle $\alpha'$ is not equal to the entrance angle $\theta$, and the value of $n$ in the formula is not equal to 1.

While certain specific embodiments of the present invention have been disclosed as typical, the invention is of course not limited to these particular forms, but rather is applicable broadly to all such variations as fall within the scope of the appended claims. For example, the values and criteria given above treat the exact solution of the distortion problem. The behavior of optical systems is in general a continuous function of their parameters. Therefore, small variations in the values and criteria may be permitted if one can tolerate the resulting small variation in the distortion achieved.

It is evident that there is a symmetrical relationship between the image projected by the first projection system 15, 15a, or 15c and the image presented for viewing by the spectator at the preferred location 13, 13a, etc. Thus the image could as well be projected from point 13 or 13a and viewed at the position of lens 18. To obtain any appreciable size of viewing field the characteristics of the screen 10, 10a or 10c and the light-directing reflector 16, 16a or 16c would have to be interchanged. However, the positions of the conicoids 10, 16, etc., would not change nor would the properties or orientation of the lenses 17, 17a, 17b, 17c and 17d change. In the FIG. 8 case the plano side of the coscopic lens would then face the first conicoid rather than the second.

Further, when the size of one of the conicoids 10 or 16 is much greater than the size of the other, the required eccentricity of that other conicoid becomes very small. A conicoid with zero eccentricity is a sphere, a shape notably easier to produce than a more general ellipsoid of revolution. If in a particular installation the resulting small aberrations can be tolerated it is contemplated that the prescribed ellipsoid of small eccentricity may be replaced by an approximating sphere without departing from the coverage of the appended claims.

In all of the foregoing treatment, the relationships of the projection elements and the conicoids have been discussed with respect to a common axis. This axis has been shown as a spatial one but mentioned to be optical. It is of course the optical axis that is significant to the relations disclosed, and this axis may be folded one or more times by the interposition of plane mirrors in a well-known and conventional manner without affecting the principle of this invention at all.

In the forms shown the screen is placed on only a portion of a conicoid to one side of the optic axis. This is the preferred form since it permits the contrast enhancing techniques of applicant's early patents to be employed. However, it is not intended that this should be a limiting characteristic, since the principles taught apply as well to conicoids symmetrical to the optic axis.

Lastly, it is noted that the essential function of the system is to produce for a viewer at 13, 13a or the like, an orthoscopic representation of the image projected by the first projection system 15, 15a, or 15c. Since in the preferred form the desired final image was assumed to be an orthoscopic representation of the initial optical object, for example film, the first projection system is in that case orthoscopic. This same configuration will suffice even if the original film is anamorphically distorted, as in Cinemascope, if deanamorphosing lenses are interposed to yield an undistorted aerial image for lens 18 to view. It also is possible to utilize such deanamorphosing lenses directly as the lens 18 or its equivalent. In either of these instances, the first projection system will function to project on director 16 or its equivalent an orthoscopic image of a scene which is depicted anamorphically on the film, with resultant projection of a correspondingly undistorted image of the original scene for viewing at 13 or the like.

What is claimed is:

1. Apparatus comprising a light-reflecting structure shaped essentially as a curved first conicoid of revolution, a first optical projection system constructed to view an optical object spaced from said light-reflecting structure and project a first image thereof essentially in focus on said structure, a screen shaped essentially as a curved second conicoid of revolution which optically has essentially the same axis of revolution as said first conicoid, and a second optical projection system located essentially on said common axis of revolution of the two conicoids and constructed to view said image on said light-reflecting structure and reproject it as a second image in focus on said screen.

2. Apparatus as recited in claim 1, in which said second projection system has a nodal point located essentially at a focus of one of said conicoids.

3. Apparatus as recited in claim 1, in which said second projection system has its nodal points located essentially at focii of said two conicoids respectively.

4. Apparatus as recited in claim 1, in which said second projection system is constructed to divert an incoming chief ray directed at an angle $\theta$ to said axis so that it leaves said second projection system at an angle $\sin^{-1}(n \sin\theta)$ to said axis.

5. Apparatus as recited in claim 1, in which said second projection system is orthoscopic with unit angular magnification.

6. Apparatus as recited in claim 1, in which said second projection system is a concentric spherically curved lens having its center located essentially at a common focus of the two conicoids.

7. Apparatus as recited in claim 1, in which said second projection system has a spherically curved surface at one side concentric with the center of the effective aperture stop of the system and a planar surface at its opposite side and is located essentially at a focus of said first conicoid.

8. Apparatus as recited in claim 1, in which said light-reflecting structure is an optical director positioned at approximately the surface of focus of said first image and having an irregular surface forming a large number of small reflective facets constructed to direct the light from different portions of said first image primarily along converging paths in a relation concentrating the light more on said second optical projection system than if said structure had a smooth light-reflecting surface following exactly the curvature of said first-mentioned conicoid.

9. Apparatus as recited in claim 1, in which said first projection system is constructed to produce essentially a central projection of said object on said light-reflecting structure.

10. Apparatus as recited in claim 1, in which said first conicoid is essentially an ellipsoid of revolution and said second conicoid is essentially a paraboloid of revolution.

11. Apparatus as recited in claim 1, in which said first projection system includes two selectively usable projectors for containing two of said optical objects, mirror means operable to selectively direct images of said two objects from said two projectors to a common location, and a relay lens structure operable to view either of said images from said two projectors at said common location and to produce essentially a central projection thereof on said light-reflecting structure as said first image of claim 1.

12. Apparatus as recited in claim 1, in which each of said projectors has a first lens shaped and positioned to produce an intermediate image at infinity of one of said objects, and has a second lens adapted to produce through said mirror an aerial image of one of said intermediate images, undistorted with respect to the original object, which is so positioned as to be reprojected by said relay lens structure.

13. Apparatus as recited in claim 1, in which said light-reflecting structure is an optical director positioned at approximately the surface of focus of said first image and having an irregular surface forming a large number of small reflective facets constructed to direct the light from different portions of said first image primarily along converging paths in a relation concentrating the light more on said second optical projection system than if said structure had a smooth light-reflecting surface following exactly the curvature of said first-mentioned conicoid, said second projection system having a nodal point located essentially on said common axis and at a focus of one of said conicoids, said second projection system being a lens structure constructed to divert an incoming chief ray directed at an angle $\theta$ to said axis so that it leaves said second projection system at an angle $\sin^{-1}(n \sin\theta)$ to said axis.

14. Apparatus comprising a light-reflecting structure shaped essentially as an ellipsoid, a first optical projection system constructed to view an optical object spaced from said light-reflecting structure and to project an image thereof onto said structure, a second optical projection system located essentially at a focus of said ellipsoid and constructed to view said image on said structure and to reproject it as a second image, and a screen onto which said second image is projected and shaped essentially as a paraboloid having a focus at essentially the location of said second projection system.

15. Apparatus comprising a light-reflecting structure shaped essentially as a conicoid, a first optical projection system constructed to view an optical object spaced from said light-reflecting structure and to project an image thereof onto said structure, a second optical projection system located essentially at a focus of said conicoid and constructed to view said image on said structure and to reproject it as a second image, a screen onto which said second image is projected and shaped essentially as a second conicoid having a focus at essentially the location of said second projection system, said light-reflecting structure being an optical director positioned at approximately the surface of focus of said first image and having an irregular surface forming a large number of small reflective facets constructed to direct the light from different portions of said first image primarily along converging paths in a relation concentrating the light more on said second optical projection system than if said structure had a smooth light-reflective surface following exactly the curvature of said first-mentioned conicoid, said first projection system including a lens constructed to produce essentially a central projection of said object on said optical director, said two conicoids having essentially a common axis of revolution and being optically conjugate, said lens being located essentially on said common axis of revolution, said second projection system being a concentric spherically curved lens having its center of curvature essentially coincident with said focii of both of said conicoids, and means forming a viewing area within which viewers are to be located for viewing said second image on said screen, said viewing area being located so that an optimum viewing location therein is positioned along said common axis of the conicoids at a distance from the center of said spherically curved lens essentially equal to $Q$, where:

$$Q = \frac{faq}{q\sqrt{a^2-b^2}+b^2-af}$$

and where:

$f$ is the focal length of the spherically curved lens,
$a$ is the semimajor axis of said first conicoid,
$b$ is the semiminor axis of said first conicoid, and $q$ is the distance along said common axis of revolution of the conicoids from the center of said spherically curved lens to said lens of the first projection system.

16. Apparatus comprising a light-reflecting structure shaped essentially as a conicoid, a first optical projection system constructed to view an optical object spaced from said light-reflecting structure and to project an image thereof onto said structure, a second optical projection system located essentially at a focus of said conicoid and constructed to view said image on said structure and to reproject it as a second image, and a screen onto which said second image is projected and shaped essentially as a second conicoid having a focus at essentially the location of said second projection system, said two conicoids having essentially a common axis of revolution, both of said projection systems being located essentially on said common axis of revolution, there being a viewing area within which viewers are to be positioned for viewing said second image on said screen, said viewing area being located so that an optimum viewing location therein is positioned along said common axis of the conicoids at a distance from said second projection system essentially equal to $Q$, where:

$$Q = \frac{faq}{q\sqrt{a^2 - b^2} + b^2 - af}$$

and where:
$f$ is the focal length of said second projection system,
$a$ is the semimajor axis of said first conicoid,
$b$ is the semiminor axis of said first conicoid, and
$q$ is the distance along said common axis of revolution of the conicoids from said first projection system to said second projection system.

17. Apparatus comprising a light-reflecting structure shaped essentially as a first conicoid of revolution having a focus at a predetermined location, a first optical projection system constructed to view an optical object spaced from said light-reflecting structure and project a first image thereof essentially in focus on said structure, a screen shaped essentially as a second conicoid of revolution which optically has essentially the same axis of revolution as said first conicoid and has a focus at essentially the same location as said focus of the first conicoid, and a second optical projection system located essentially on said common axis of revolution of the two conicoids and essentially at said focii of both of said conicoids and constructed to view said image on said light-reflecting structure and reproject it as a second image in focus on said screen.

18. Apparatus as recited in claim 17, in which said second projection system is an orthoscopic lens structure.

19. Apparatus as recited in claim 17, in which said second projection system is a concentric spherically curved lens.

20. Apparatus as recited in claim 17, in which said second projection system is a concentric spherically curved lens, having its center of curvature essentially coincident with said focii of both of said conicoids.

21. Apparatus as recited in claim 17, in which said light-reflecting structure is an optical director positioned at approximately the surface of focus of said first image and having an irregular surface forming a large number of small reflective facets constructed to direct the light from different portions of said first image primarily along converging paths in a relation concentrating the light more on said second optical projection system than if said structure had a smooth light-reflecting surface following exactly the curvature of said first-mentioned conicoid.

22. Apparatus as recited in claim 17, in which said first projection system is located essentially on said common axis of revolution of the two conicoids.

23. Apparatus as recited in claim 17, in which said first projection system is constructed to produce essentially a central projection of said object on said light-reflective structure.

24. Apparatus as recited in claim 17, in which said first projection system includes tow selectively usable projectors for containing two of said optical objects, mirror means operable to selectively direct images of said two objects from said two projectors to a common location, and a relay lens structure operable to view either of said images from said two projectors at said common location and to produce essentially a central projection thereof on said light-reflective structure as said first image of claim 17.

25. Apparatus as recited in claim 24, in which each of said projectors has a first lens shaped and positioned to produce an intermediate image at infinity of one of said objects, and has a second lens adapted to produce through said mirror an aerial image of one of said intermediate images, undistorted with respect to the original object, which is so positioned as to be reprojected by said relay lens structure.

26. Apparatus as recited in claim 24, in which said two projectors are directed essentially toward one another, and said mirror means includes a mirror between the projectors adapted to be turned to different positions for reflecting light from either of said projectors essentially perpendicularly and along a common path toward said relay lens structure.

27. Apparatus as recited in claim 17, in which said light-reflecting structure is an optical director positioned at approximately the surface of focus of said first image and having an irregular surface forming a large number of small reflective facets constructed to direct the light from different portions of said first image primarily along converging paths in a relation concentrating the light more on said second optical projection system than if said structure had a smooth light-reflective surface following exactly the curvature of said first-mentioned conicoid, said first projection system including a lens constructed to produce essentially a central projection of said object on said optical director, said two conicoids being optically conjugate, said lens being located essentially on said common axis of revolution, said second projection system being a concentric spherically curved lens having its center of curvature essentially coincident with said focii of both of said conicoids.

28. Apparatus as recited in claim 1, in which said first conicoid is essentially an ellipsoid of revolution and said second conicoid is essentially an ellipsoid of revolution.

29. Apparatus comprising a first structure shaped essentially as a curved first conicoid of revolution, a screen shaped essentially as a curved second conicoid of revolution which optically has essentially the same axis of revolution as said first conicoid, and an optical projection system located essentially on said common axis of revolution of the two conicoids and constructed to view an image on said first structure and reproject it as an image in focus on said screen.

30. Apparatus as recited in claim 29, in which said projection lens has a conicoidal curvature of field having a semi latus rectum less than the semi latus rectum of said first conicoid.

* * * * *